(12) United States Patent
Zhu et al.

(10) Patent No.: US 7,551,434 B2
(45) Date of Patent: Jun. 23, 2009

(54) MOUNTING APPARATUS FOR DATA STORAGE DEVICE

(75) Inventors: Qiang Zhu, Shenzhen (CN); Jin-Man Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 14 days.

(21) Appl. No.: 11/953,873

(22) Filed: Dec. 11, 2007

(65) Prior Publication Data

US 2009/0121105 A1    May 14, 2009

(30) Foreign Application Priority Data

Nov. 8, 2007    (CN) .................... 2007 1 0202422

(51) Int. Cl.
*H05K 7/14* (2006.01)

(52) U.S. Cl. .............. 361/685; 248/539; 312/223.2; 360/97.02

(58) Field of Classification Search .......... 248/122.1, 248/539, 694; 369/13.02, 30.17, 44.11; 250/201.5; 211/26.2; 312/330.1, 223.2; 360/97.02; 361/679.33

See application file for complete search history.

(56) References Cited

U.S. PATENT DOCUMENTS

| 7,038,907 | B2 * | 5/2006 | Chen ..................... 361/685 |
| 2008/0013271 | A1 * | 1/2008 | Peng et al. .............. 361/684 |
| 2008/0017778 | A1 * | 1/2008 | Fan et al. ................ 248/539 |

* cited by examiner

*Primary Examiner*—Hung V Duong
(74) *Attorney, Agent, or Firm*—Frank R. Niranjan

(57) ABSTRACT

A mounting apparatus is provided to readily fix a data storage device defining at least one hole in place. The mounting apparatus includes a bracket holding the storage device, a securing plate, and a pole coupled to the securing plate. The bracket defines at least one through hole corresponding to the hole of the storage device, and a positioning plate defining a sliding groove extends perpendicularly from the bracket. At least one post extends from the securing plate, and engages in the corresponding hole of the storage device to fasten the storage device. One end of the pole is pivotably mounted on the bracket, and the other end of the pole extends though the sliding groove of the positioning plate, and is slidable in the sliding groove to control the post of the securing plate to engage or disengage the hole of the storage device.

7 Claims, 4 Drawing Sheets

MOUNTING APPARATUS FOR DATA STORAGE DEVICE

BACKGROUND

1. Technical Field

The present invention relates to mounting apparatuses and especially to a mounting apparatus for readily fixing or removing a data storage device.

2. General Background

Generally speaking, when a computer is assembled, a bracket is mounted in a computer enclosure, and then data storage devices are fixed to the bracket. The data storage devices may include various combinations of hard disk drives (HDDs), floppy disk drives (FDDs), and compact disk-read only memory (CD-ROM) drives.

Conventionally, a storage device is attached to a bracket of a computer by bolts. However, attachment by bolts is tiresome and time-consuming.

To address the aforementioned problem, a mounting apparatus not requiring the use of bolts is invented. The mounting apparatus includes a bracket, a securing element for fixing a storage device in the bracket, and a fastener for fixing the securing element to the outside of the bracket. The securing element includes a plurality of posts extending through the bracket to engage with the storage device. However, it is complicated and time-consuming to manipulate all the components including the latch plate and the fastener when using the mounting apparatus.

What is desired, therefore, is a mounting apparatus which allows readily manipulating installation or removal of a storage device thereto or therefrom.

SUMMARY

An exemplary mounting apparatus for a data storage device includes a bracket fastened to a computer enclosure, a securing plate, and a pole connected to the securing plate. The storage device defines at least one hole in a sidewall thereof. The bracket defines at least one through hole corresponding to the hole of the storage device. A positioning plate with a slanted sliding groove extends perpendicularly from the outside of the bracket. One end of the pole is fixed pivotably to the bracket, and the other end is a free end. The free end is passed through the sliding groove of the positioning plate. At least a post extrudes from the securing plate thereof for fixing the storage device. When operating the free end of the pole to move in the sliding groove, the pole can force the post to pass through the through hole of the bracket to engage in the hole of the storage device, and then the storage device is stably fixed in the bracket.

Other advantages and novel features will become more apparent from the following detailed description when taken in conjunction with the accompanying drawings, in which:

DETAILED DESCRIPTION OF THE EMBODIMENT

Figure 1:
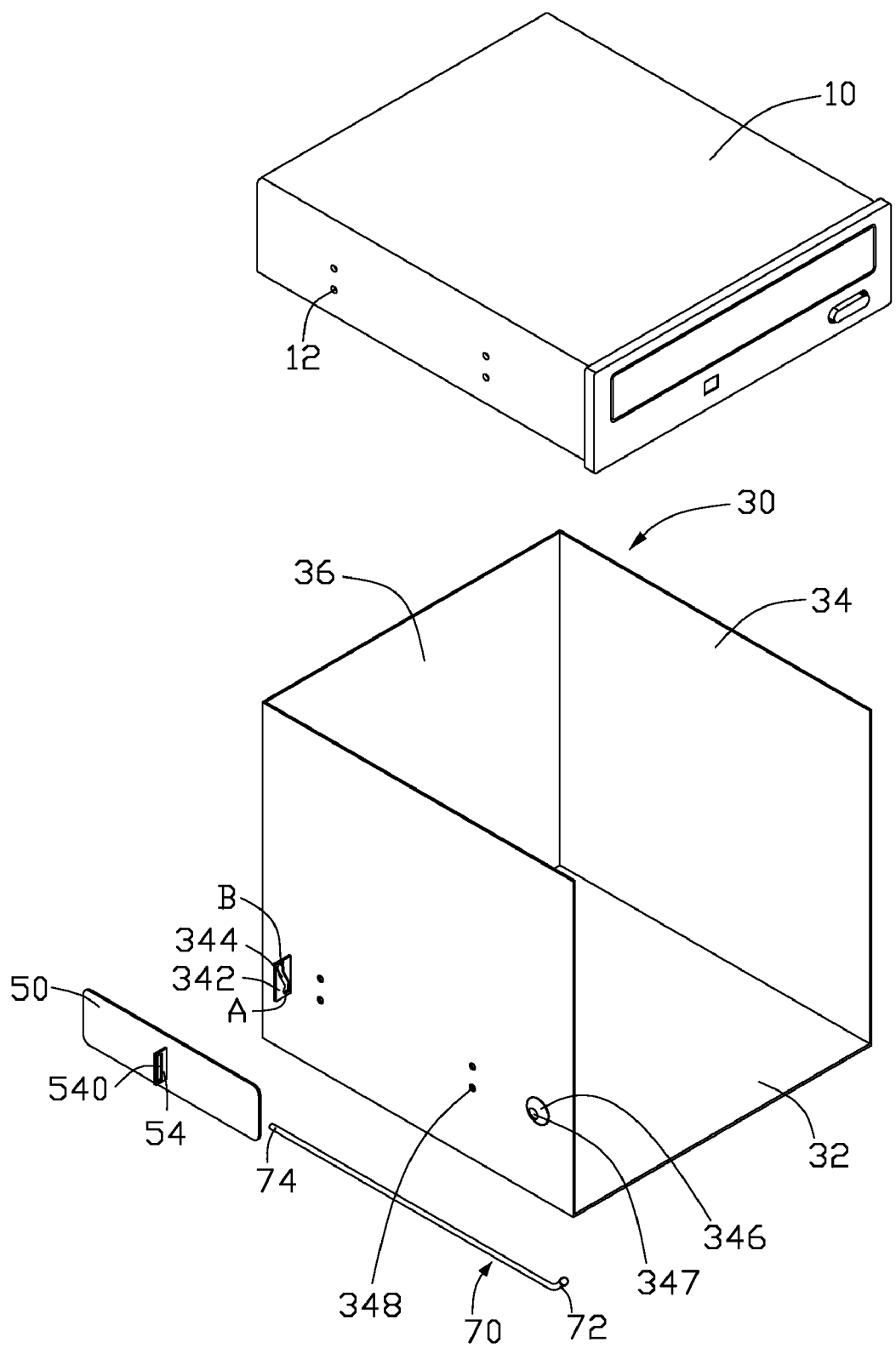
FIG. 1 is an exploded, isometric view of a mounting apparatus in accordance with an embodiment of the present invention together with a storage device.

Referring to FIG. 1, a mounting apparatus in accordance with an embodiment of the present invention is provided for holding a data device like a data storage device 10 in place. The storage device 10 includes four holes 12 defined in one sidewall thereof. The holes 12 are arrayed in two lines. The mounting apparatus includes a bracket 30 to receive the storage device 10 therein, a securing plate 50 fastened to the bracket 30, and a pole 70.

The bracket 30 may be fastened to a computer enclosure (not shown) by bolts or the like. The bracket 30 includes a bottom plate 32, a pair of parallel side panels 34 extending perpendicularly from two longitudinal edges of the bottom plate 32 respectively, and a rear panel 36 connected to vertical edges of the side panels 34 respectively. A positioning plate 342 defining a sliding groove 344 therein extends perpendicularly from an exterior of one side panel 34, and the positioning plate 342 neighbors the rear panel 36. The sliding groove 344 generally slanting towards the side panel 34 includes a slanted part and two vertical parts A, B extending oppositely and vertically from each end of the slanted part respectively, the vertical part B is located away from the side panel 34 and the vertical part A is located adjacent the side panel 34. A dome-shaped fixing member 346 extrudes out from the exterior of the side panel 34 and is positioned away from the rear panel 36, and the fixing member 346 defines a through hole 347 therein. Thus the interior of the side panel 34 bounded by the fixing member 346 forms a receiving room. The side panel 34 defines four through holes 348, corresponding to the four holes 12 of the storage device 10.

Figure 2:
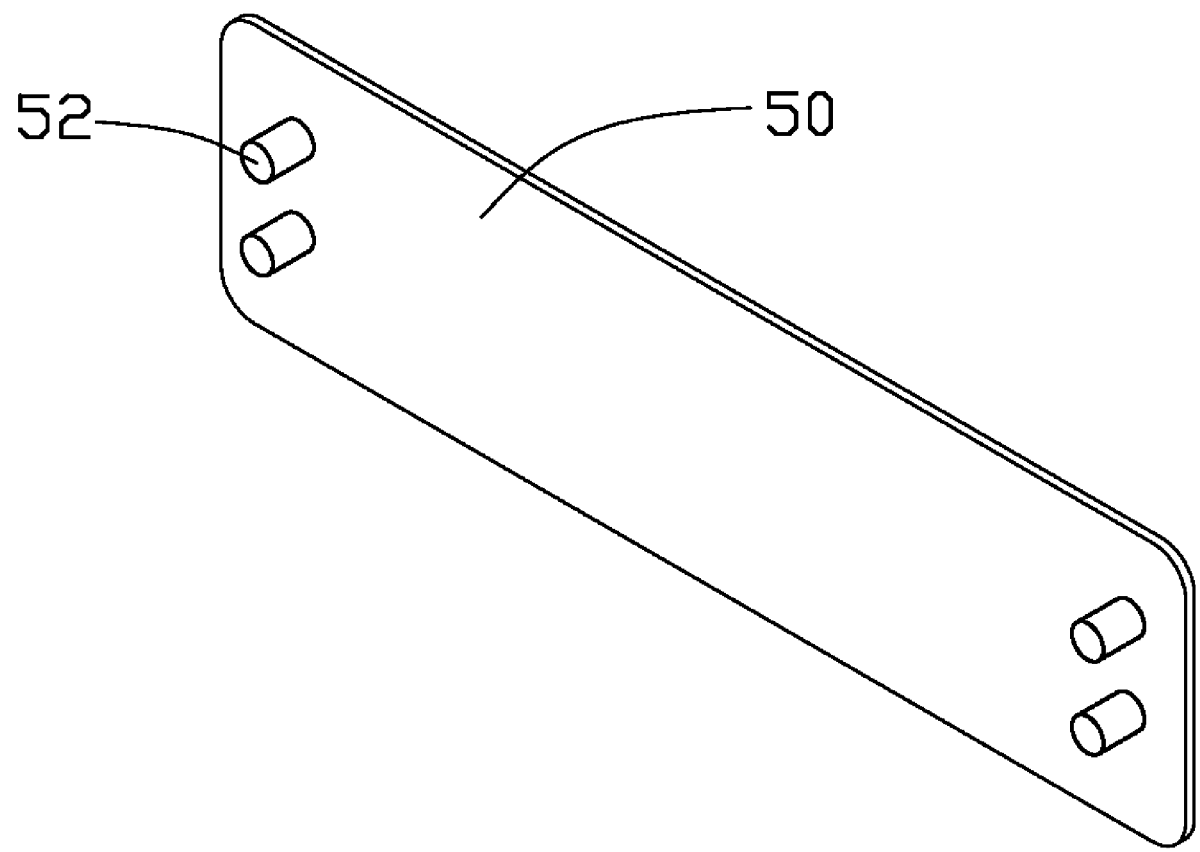
FIG. 2 is an enlarged view of a securing plate of FIG. 1, but viewed from another aspect

Referring to FIG. 1 and FIG. 2, four posts 52 corresponding to the four holes 12 of the storage device 10 extend from one side of the securing plate 50. A latch plate 54 defining a slot 540 therein extends perpendicularly from a middle part of the other side of the securing plate 50.

Continuing to refer to FIG. 1, the pole 70 is an elastic pole. One end of the pole is bent to form a fixing end 72, and the other end is a free end 74.

Figure 3:
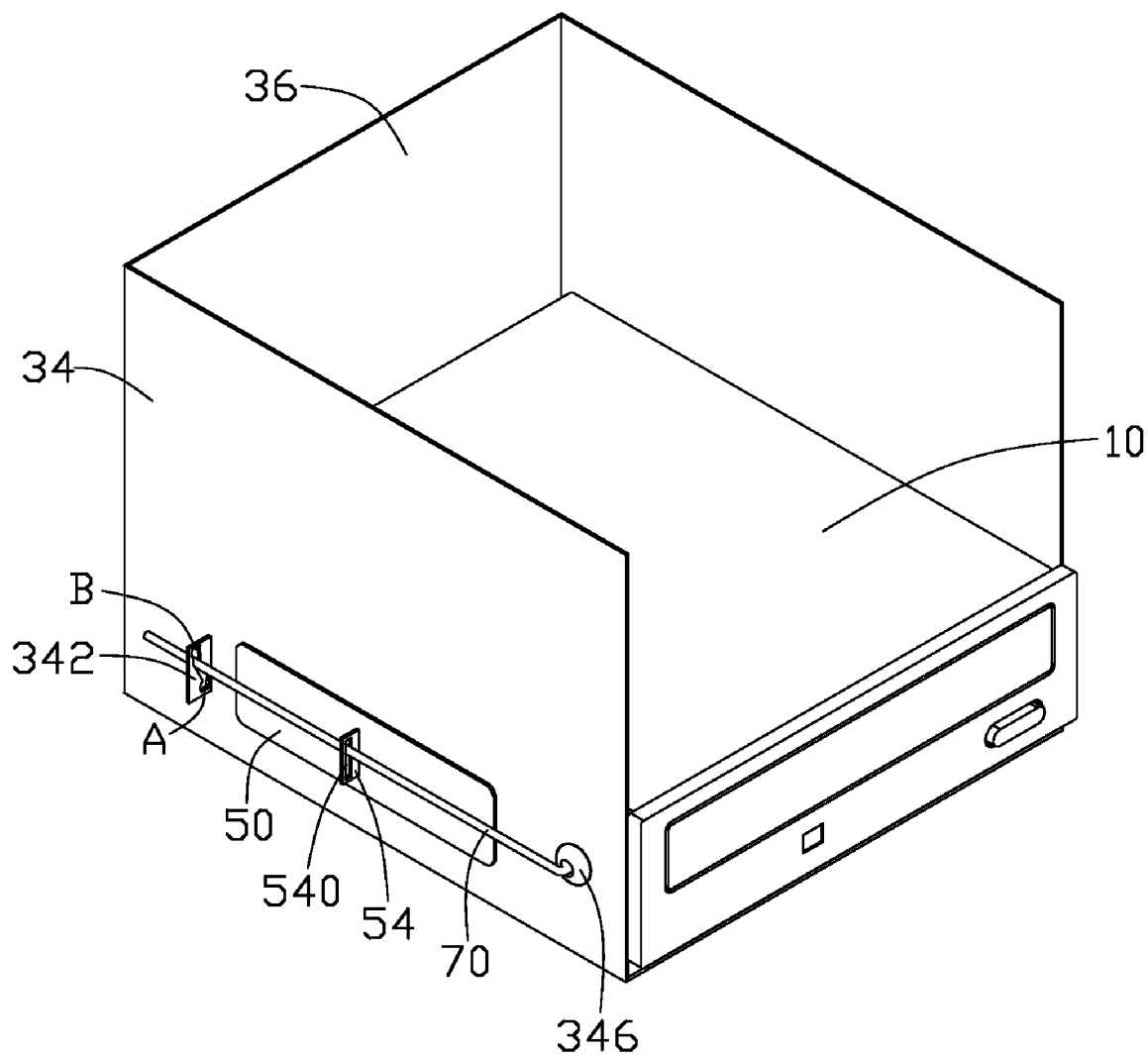
FIG. 3 is an assembled view of FIG. 1.

Referring to FIG. 3, the free end 74 of the pole 70 is passed through the through hole 347 of the fixing member 346 from the inside of the bracket 30. Then the free end 74 is pulled to move to outside of the bracket 30, and then the fixing end 72 is received in the receiving room. The free end 74 is passed through the slot 540 of the latching plate 54, thus the securing plate 50 is movably coupled to the pole 70. When the pole 70 is rotated to be parallel with the side panel 34, the free end 74 is passed through the sliding groove 344 of the positioning plate 342, and the pole 70 is movably attached to the positioning plate 342. The pole 70 is moved to the extending part B of the sliding groove 344.

To assemble the storage device 10 to the bracket 30, the storage device 10 is pushed into the bracket 30 in a longitudinal direction along the bottom plate 32 of the bracket 30 until the storage device 10 is stopped by the rear panel 36, thus the holes 12 of the storage device 10 align with the through holes 348 of the side panel 34 respectively, and the securing plate 50 is moved along the pole 70 until the posts 52 of the securing plate 50 are aligned with the through holes 348 respectively. Then the pole 70 is moved from extending part B of the sliding groove 344 to the extending part A of the sliding groove 344, because the distance between the extending part B and the side panel 34 is much shorter than the distance between the extending part A and the side panel 34, the securing plate 50 coupled to pole 70 is moved towards the side panel 54 and pressed towards the side panel 34, thus the posts 52 are extended through the through holes 348 to engage in the holes 12 of the storage device 10 respectively for fixing the storage device 10 in the bracket 30.

To detach the storage device 10, The pole 70 is moved from the extending part A of the sliding groove 344 to the extending part B of the sliding groove 344, and the pole 70 is moved away from the side panel 34. Thus the securing plate 50 coupled to the pole 70 is also moved away from the side panel 34, the posts 52 of the securing plate 50 are disengaged from the holes 12 of the storage device 10, and the storage device 10 is ready to be removed from the bracket 30.

Figure 4:
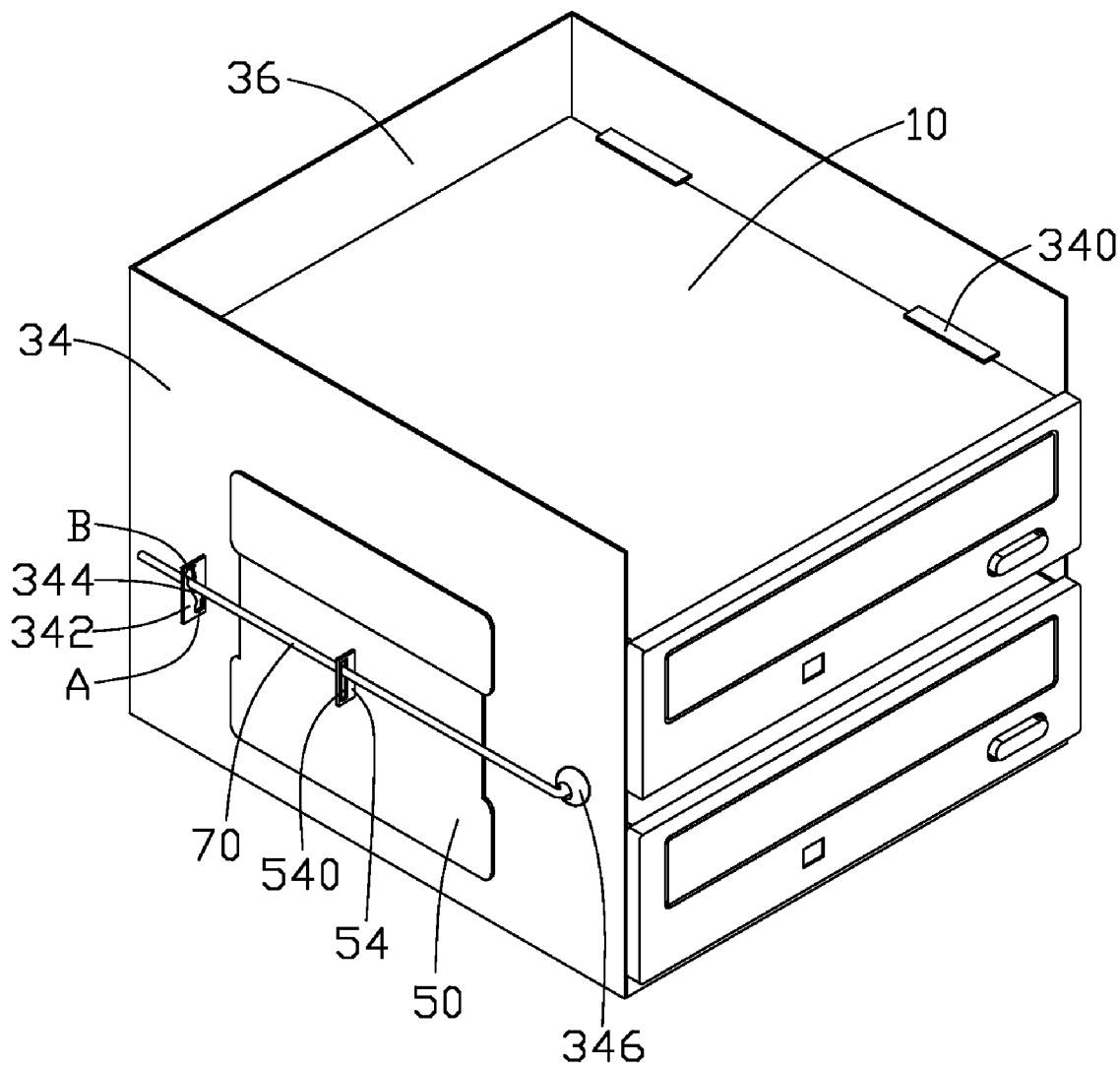
FIG. 4 is an assembled, isometric view of a mounting apparatus in accordance with another embodiment of the invention together with storage devices.

Referring to FIG. 4, another embodiment of the invention includes a side panel 34 defining through holes 348, and a securing plate 50 forming posts 52 corresponding to the holes 12. A plurality of supports 340 extends from the interior surface of side panel 34 to support a plurality of the storage devices 10 respectively, and then the plurality of the storage devices 10 is simultaneously fixed. The sliding groove 344 can be a slanted slot or include a slanted part and two horizontal portions respectively extending horizontally from opposite ends of the slanted part.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment.

What is claimed is:

1. A mounting apparatus for a data storage device, the storage device defining at least one hole in a sidewall thereof, the mounting apparatus comprising:

a bracket configured to accommodate the storage device, the bracket comprising a side panel corresponding to the sidewall of the storage device; and defining at least one through hole therein corresponding to the hole of the storage device; a positioning plate extending perpendicularly from the side panel defining a generally slanted sliding groove; the sliding groove comprising one end neighboring the side panel and the other end positioned away from the side panel; and a securing plate configured to fix the storage device, at least one post extending from a surface of the securing plate corresponding to the hole of the storage device; and a pole combined with the securing plate with one end thereof pivotably attached to the bracket, and the other end manipulated to slide in the sliding groove for driving the securing plate to move towards or away from the side panel of the bracket for extending or disengaging the at least one post into or from the at least one hole of the storage device.

2. The mounting apparatus as claimed in claim 1, wherein the securing plate comprises a latching plate extending perpendicularly from an opposite surface thereof, the latching plate defines a slot therein; the pole is passed through the slot, and is slidable in the slot.

3. The mounting apparatus as claimed in claim 1, wherein the sliding groove comprises a slanted portion and two vertical portions extending from opposite ends of the slanted portion in opposite directions respectively.

4. The mounting apparatus as claimed in claim 1, wherein the sliding groove comprises a slanted portion and two horizontal portions extending from opposite ends of the slanted portion in opposite directions respectively.

5. The mounting apparatus as claimed in claim 1, wherein the bracket comprises a pair of parallel side panels; the through hole is disposed in one of the side panels, a dome-shaped fixing member defining a through hole therein extrudes out from the exterior of the side panel, the interior of the side panel bounded by the fixing member forms a receiving room; and Said other end of the pole is passed into the through hole of the fixing member, said one end is bent to form a fixing end received in the receiving room for pivotably attaching the pole to the bracket.

6. The mounting apparatus as claimed in claim 5, wherein a plurality of supports extend from the interior surface of side panels to support a plurality of the storage devices.

7. The mounting apparatus as claimed in claim 1, wherein the pole is an elastic pole.

* * * * *